July 2, 1957 E. A. JAMES 2,797,735
SEAT STRUCTURES AND UPHOLSTERY UNITS THEREFOR
Filed March 5, 1953 3 Sheets-Sheet 1
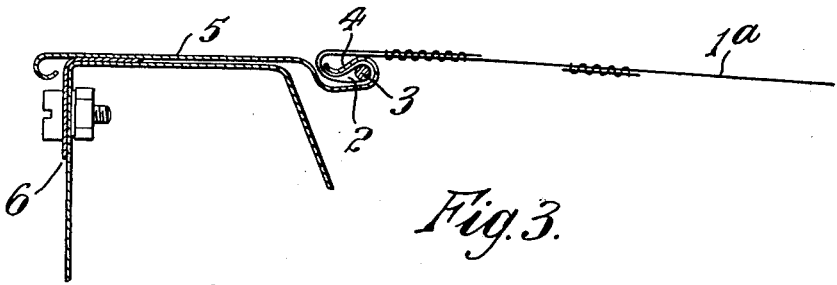
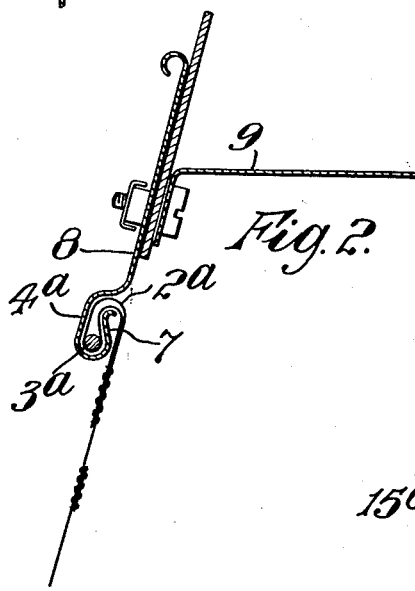
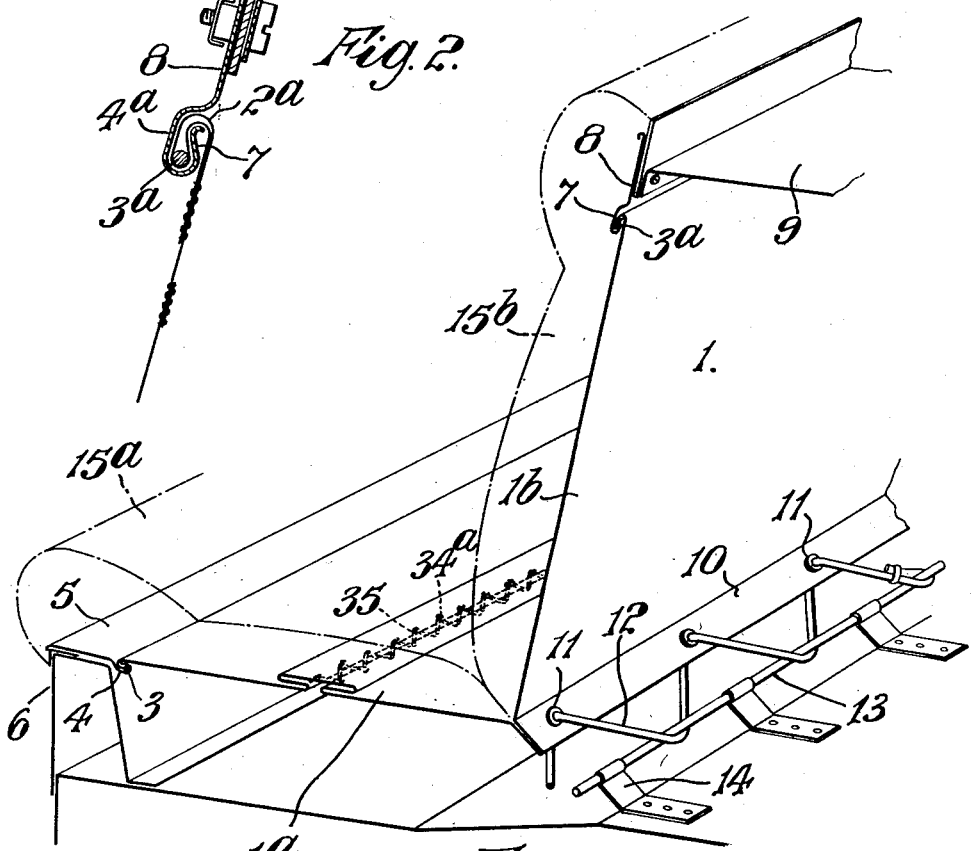
INVENTOR
Ernest Alfred James.
BY
Elmer Jamison Gray
ATTORNEY.

July 2, 1957  E. A. JAMES  2,797,735
SEAT STRUCTURES AND UPHOLSTERY UNITS THEREFOR
Filed March 5, 1953  3 Sheets-Sheet 2
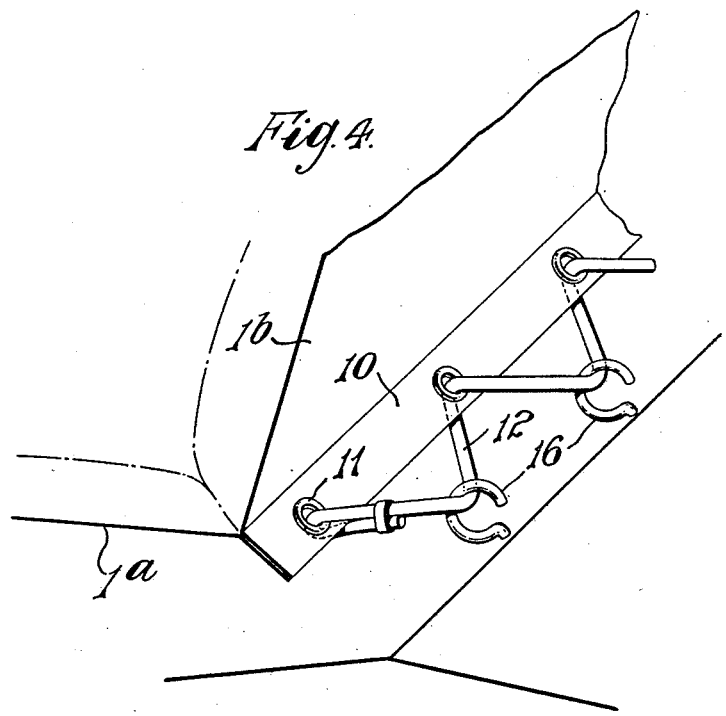
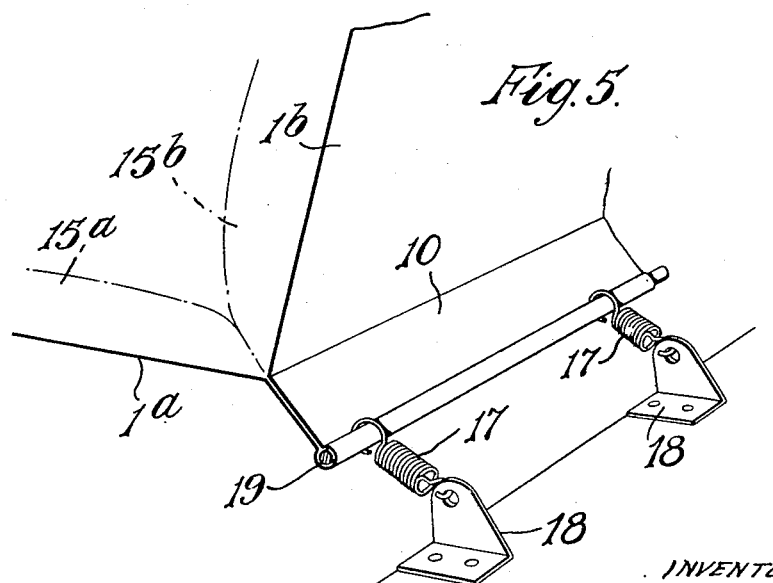
INVENTOR
Ernest Alfred James,
BY
Elmer Jamison Gray
ATTORNEY.

July 2, 1957  E. A. JAMES  2,797,735
SEAT STRUCTURES AND UPHOLSTERY UNITS THEREFOR
Filed March 5, 1953  3 Sheets-Sheet 3

INVENTOR
Ernest Alfred James.
BY
ATTORNEY.

United States Patent Office 2,797,735
Patented July 2, 1957

2,797,735

SEAT STRUCTURES AND UPHOLSTERY UNITS THEREFOR

Ernest Alfred James, Hornchurch, England, assignor, by mesne assignments, to Chrysler Corporation, a corporation of Delaware Application March 5, 1953, Serial No. 340,512

9 Claims. (Cl. 155—53)

This invention relates to seat structures and upholstery units therefor and it is an object of the invention to provide an improved form of upholstery unit and improved means for attaching it to the seat frame.

According to the present invention a seat structure comprises a length of flexible material secured at opposite edges to supports so as to form a seat and back rest supporting portions, the portion of the flexible material adjacent to the junction of said seat and back rest portions being connected by resilient tensioning means to a fixed support at the rear of the seat structure. The resilient means may comprise an elastic cord or coil springs extending between the flexible material and fixed supports located rearwardly of the seat.

A seat according to the present invention provides a hammock like arrangement which permits a certain amount of relative movement between the seat and back rest portions to allow these parts to adapt themselves to the particular occupant and thereby ensure that the maximum comfort will be obtained by various occupants although they may differ considerably in size and weight.

To enable the invention to be fully understood it will now be described with reference to the accompanying drawings, in which:

Fig. 1 is a fragmentary perspective view of a vehicle seat structure embodying one form of the invention;

Figs. 2 and 3 are details showing means for attaching the upper and lower edges of the flexible material to the supports;

Fig. 4 is a fragmentary view showing a modified method of attaching the resilient means;

Fig. 5 is a similar view to Fig. 4 showing a modified form of relisient means.

Figure 6:
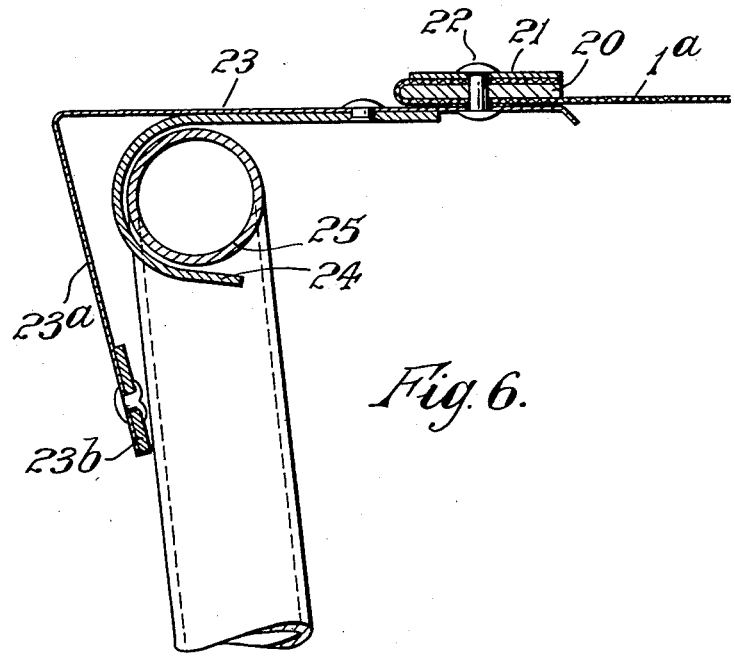
Figs. 6 and 7 are details showing modified means for securing the edges of the flexible material to the supports.

As shown in Figs. 1 to 3 of the accompanying drawings 1 indicates generally a sheet of flexible material, for example canvas, which comprises a substantially horizontal seat supporting portion 1ᵃ and an upwardly extending backrest supporting portion 1ᵇ. As shown the free edge of the seat portion 1ᵃ is folded over and secured to itself to form a transversely extending loop 2 through which is inserted a rod 3 adapted to be fitted into a hook or recess portion 4 of a plate 5 secured, as by spot welding, to a front frame member 6. The upper edge of the back rest portion 1ᵇ is secured in a similar manner by providing it with a loop 2ᵃ in which is inserted a rod 3ᵃ, fitted into the hook or recess 7 of a plate 8 secured to the frame member 9. This arrangement permits the flexible material to be readily and detachably secured to the fixed frame parts.

At the junction of the seat and back rest portions the flexible sheet is formed with a fold providing rearwardly extending edge portions 10 which extend transversely of the seat. The portion 10 is formed with a series of spaced eyelets 11 through which a rubber or elastic cord 12 is threaded to form a series of loops which are looped round a transverse rod 13 supported in brackets 14. The rod 13 is preferably slidable in the brackets to enable it to be readily assembled with loops and brackets in one operation. If desired, the seat and back rest portions 1ᵃ, 1ᵇ may comprise separate sheets secured together and the adjacent edges overlapped to provide a double thickness of material to form a rearwardly extending edge portion such as 10.

In the embodiment shown in the drawings the flexible sheet is adapted to support suitable upholstery units indicated by 15ᵃ, 15ᵇ. These may comprise layers of foam rubber or other padding material covered by trim fabric, or units provided with interior springing. The upholstery units will be secured to the seat and back rest portions of the flexible sheet in such a manner as to permit their relative movement adjacent to the junction of these portions.

By the provision of a flexible sheet having resilient anchoring and tensioning means at the junction of the seat and back rest portions, a resilient pull will be applied to said portions tending to hold them taut but will permit relative movement between the seat and back rest to accommodate different occupants and thereby ensure maximum comfort in spite of the fact that the occupants may differ in size and weight. Further as the flexible sheet is capable of ready flexing movement it will be possible for an occupant to obtain maximum comfort and support in various positions. This is distinguished from previously known seat structures where the seat comprised upholstery units supported on rigid panels, as in such cases the only flexibility permitted was that obtained in the springs or padding of the units themselves.

According to the modification shown in Fig. 4 instead of the loops in the elastic cord being secured by a transverse rod they are anchored by hooks 16 for ease of attachment.

In the further modification according to Fig. 5 the elastic cord is replaced by a series of coiled springs 17 whose opposite ends are detachably anchored in apertures in brackets 18 and over a transverse rod 19 which extends through a loop formed in the free edge of the portion 10.

Figure 7:
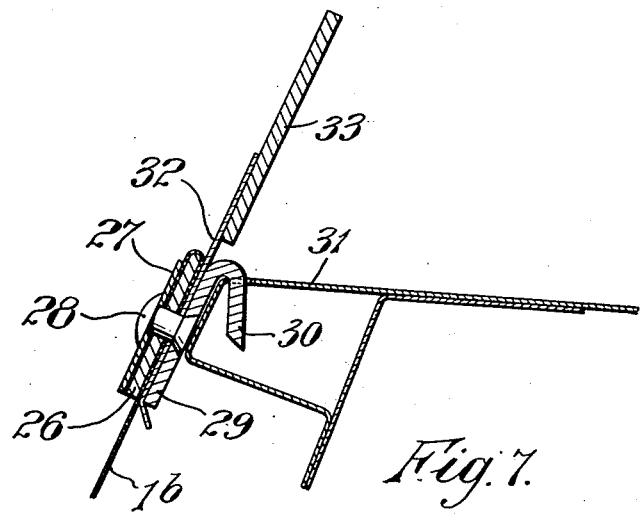

Figs. 6 and 7 illustrate modified methods of securing the free ends of the flexible sheet. As shown in Fig. 6 the free edge of the seat portion 1ᵃ is folded round a reinforcing strip 20 of cardboard or the like and a further cardboard strip 21 is placed over the folded edge. The strips 20, 21 and the folded edge of the sheet are secured by rivet means 22 to a metal plate 23 to which is riveted a hook like member 24 adapted to clip round a tubular seat frame member 25; as shown the plate 23 is formed with a downwardly bent extension 23ᵃ which is adapted to extend over the front portion of the frame member 25 and is provided with a tacking strip 23ᵇ to enable trim material to be secured. As shown in Fig. 7 the back rest portion 1ᵇ is folded at its free edge over a cardboard or like reinforcing strip 26, a further reinforcing strip 27 is positioned over the folded edge and the whole secured by rivet means 28 to a plate 29 having a hooked end 30 which engages an aperture in a rear frame member 31. As shown a further plate like member 32 is secured by the rivet and provided with a tacking strip 33 to which trim material may be attached.

To further improve the flexibility of the seat portion, the portion 1ᵃ may be provided with a transverse fold 34 preferably extending substantially the full width of the seat, the edges of the fold are suitable reinforced and formed with eyelets 34ᵃ through which is laced rubber or like elastic cord 35. This arrangement permits the parts of the seat portion on opposite sides of the fold 34 to move relatively to one another by stretching the elastic cord and thereby enables the seat portions to adapt themselves readily to the weight of the occupant and provides an increased degree of comfort. Instead of the folded portion 34 a slit may be provided the opposite edges of which are formed with eyelets to receive an elastic lace. If desired, a similar fold or slit and resilient lacing may be provided for the back rest portion 1ᵇ.

I claim:

1. A seat structure comprising fixed frame means, a length of flexible material anchored at opposite edges to said frame means and forming seat and back rest supporting portions, and an elastic cord yieldingly connecting said flexible material adjacent the juncture of said seat and back rest portions to said frame means at locations spaced transversely of said seat structure at the rear thereof.

2. A seat structure according to claim 1 wherein the elastic cord is laced through eyelets in a rearwardly extending edge of the flexible material to form loops, each loop being connected to said frame means.

3. In a seat structure, flexible material comprising a generally upright back rest supporting portion joined at its lower edge to the rear edge of a generally horizontal seat supporting portion, frame means having an upper portion supporting the upper edge of said back rest supporting portion and also having a forward portion supporting the forward edge of the seat supporting portion, an elastic cord engaging said material at a plurality of locations spaced transversely of said seat structure adjacent the juncture of said back rest and seat supporting portions and providing a loop between each juxtaposed pair of said locations, said frame means also including rod means extending transversely of said seat structure rearwardly of said juncture and passing through said loops.

4. In a seat structure, flexible material comprising a generally upright back rest supporting portion joined at its lower edge to the rear edge of a generally horizontal seat supporting portion, frame means having an upper portion supporting the upper edge of said back rest supporting portion and also having a forward portion supporting the forward edge of the seat supporting portion, an elastic cord laced through a plurality of eyelets in said material at locations spaced transversely of said seat structure adjacent the juncture of said back rest and seat supporting portions and providing a loop between each juxtaposed pair of said eyelets, said frame means also including rod means extending transversely of said seat structure rearwardly of said juncture and passing through said loops.

5. In a seat structure, flexible material comprising a generally upright back rest supporting portion joined at its lower edge to the rear edge of a generally horizontal seat supporting portion, frame means having an upper portion supporting the upper edge of said back rest supporting portion and also having a forward portion supporting the forward edge of the seat supporting portion, and an elastic cord lacing said material adjacent the juncture between said back rest and seat supporting portions to portions of said frame means located rearwardly of said juncture, said cord slidably engaging said material and said last named portions.

6. In a seat structure, flexible material comprising a generally upright back rest supporting portion joined at its lower edge to the rear edge of a generally horizontal seat supporting portion, frame means having an upper portion supporting the upper edge of said back rest supporting portion and also having a forward portion supporting the forward edge of the seat supporting portion, and an elastic cord lacing said material adjacent the juncture between said back rest and seat supporting portions to a plurality of hook portions of said frame means spaced transversely of said seat structure rearwardly of said juncture.

7. A seat structure as set forth in claim 3 and being further characterized in that said seat supporting portion comprises two relatively movable parts in juxtaposition along a line extending transversely of said seat supporting portion between the latter's rear and forward edges, and resilient means yieldingly connecting said parts along said line.

8. A seat structure as set forth in claim 5 and being further characterized in that said seat supporting portion comprises two relatively movable parts in juxtaposition along a line extending transversely of said seat supporting portion between the latter's rear and forward edges, and an elastic cord yieldingly lacing said parts together.

9. A seat structure as set forth in claim 6 and being further characterized in that said seat supporting portion comprises two relatively movable parts in juxtaposition along a line extending transversely of said seat supporting portion between the latter's rear and forward edges, and resilient means yieldable longitudinally of said structure and connecting said parts along said line.

References Cited in the file of this patent

UNITED STATES PATENTS

| | | |
|---|---|---|
| 794,145 | Ellington | July 4, 1905 |
| 1,140,930 | Wright | May 25, 1915 |
| 1,768,454 | King | June 24, 1930 |
| 2,085,475 | Saives | June 29, 1937 |
| 2,296,603 | Feldman | Sept. 22, 1942 |
| 2,421,851 | Rivard | June 10, 1947 |

FOREIGN PATENTS

| | | |
|---|---|---|
| 977,228 | Great Britain | Nov. 8, 1950 |